2,868,335

BRAKE ASSEMBLY

Paul Panhard, Paris, France, assignor to Societe Anonyme des Anciens Etablissements Panhard et Levassor, Paris, France Application April 16, 1956, Serial No. 578,357

Claims priority, application France May 6, 1955

4 Claims. (Cl. 188—72)

This invention relates to braking systems and more particularly to a brake assembly applicable to the wheels of automotive vehicles, although it is also suitable for many other applications without departing from the scope of the invention.

The brake assembly of this invention is of the so-called disk type comprising a metal rotor rigidly connected to the wheel and formed with two parallel surfaces separated by a circular space of U-shaped radial section in which a pair of registering friction linings adapted to engage metal surfaces of the aforesaid rotor are located.

In the device of this invention the brake application is effected by pressing the pair of friction linings against the relevant metal surfaces and this movement is obtained by means of a deformable circular disk engaging a pair of concentrical circular ribs of different diameter which are formed on the inner face of each lining-carrying plates, respectively, this circular disk having the additional purpose of holding said linings against rotation relative to the fixed member supporting the wheel hub on which it can move axially without rotating in a practically frictionless manner, in a direction parallel to the axis of rotation of the wheel, to permit the movement of the friction linings away from each other for braking the wheel.

With this arrangement an extremely simple and sturdy brake may be obtained which is made of very light parts, can be easily cooled and made completely tight against the ingress of dust and water without difficulties.

In order to afford a better understanding of the invention and of the manner in which the same may be carried out in the practice reference will now be made to the attached drawings forming part of this specification and illustrating diagrammatically by way of example a typical embodiment of a brake assembly for a wheel of an automotive vehicle. In the drawings.

Figure 1:
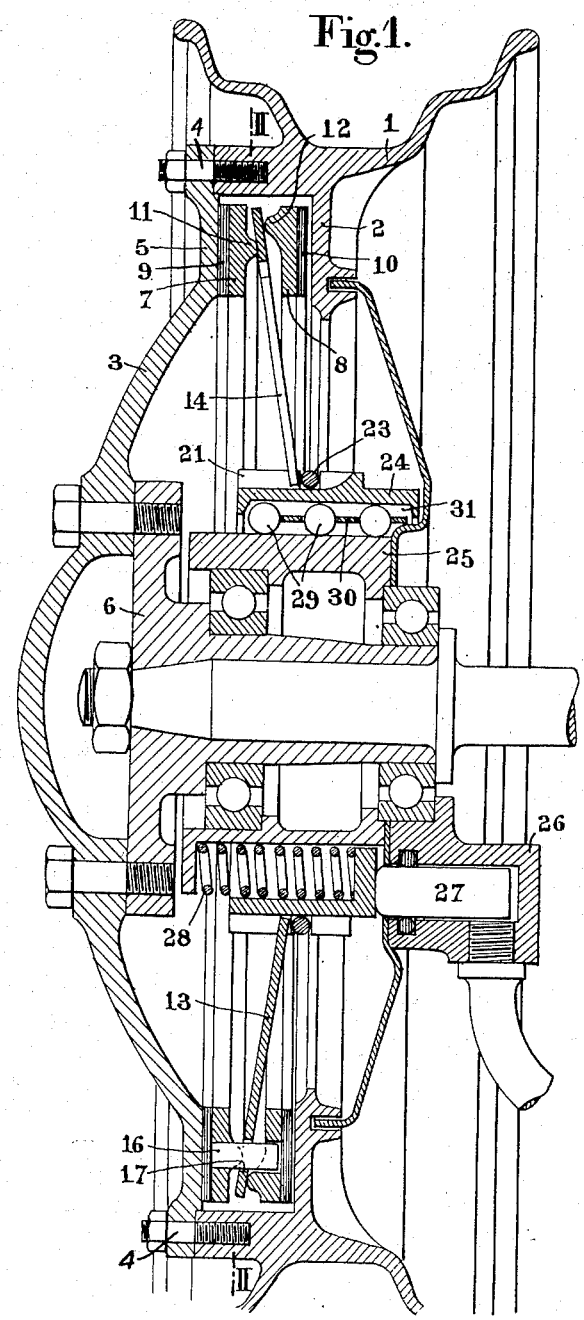
Figure 1 is a section taken upon the line I—I of Fig. 2.

The wheel 1 of any suitable type, for example of cast or stamped metal and provided with a peripheral surface curved to constitute the rim of the wheel, carries one of the aforesaid friction surfaces 2 and is secured through bolts 4 to the wheel-disk 3 carrying the other friction surface 5 which is parallel to the surface 2 and constitutes therewith, together with the wheel portion 1, a circular space of U-shaped radial section.

The wheel-disk 3 is secured in turn to the hub 6 through any suitable means.

In the space formed between the surfaces 2 and 5 are disposed a pair of brake disks 7, 8 each carrying friction linings 9, 10 respectively; these friction linings are secured on the brake disks 7, 8 in the usual manner, for example by riveting, gluing, etc.; the brake disk 7 has a circular rib 11 formed thereon, and the other brake disk 8 has also formed thereon a circular rib 12 concentrical to the rib 11 but of slightly greater diameter.

Figure 2:
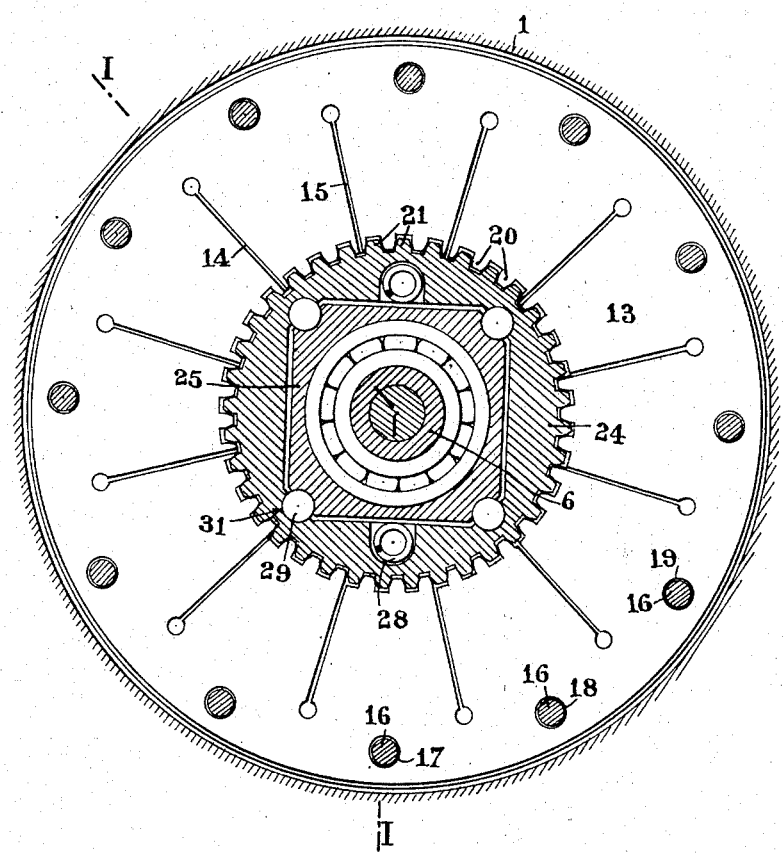
Figure 2 is a fragmentary section taken on a smaller scale upon the line II—II of Fig. 1.

These circular ribs 11, 12 are engaged by a flexible lever-forming disk 13 of tapered configuration which has formed therein a set of spaced radial saw-cuts 14, 15 (Fig. 2) to permit the deformation of this disk.

This lever-forming disk 13 is adapted to rotate bodily with the brake disks 7, 8 through pegs 16 tightly fitted in the disk 7, for example, and very loosely fitted in the other disk 8, as shown, these pegs 16 extending through holes 17, 18, 19 (Fig. 2) formed in the lever-disk 13. Thus, no friction develops between the lever-disk 13 and the pegs 16 since the axes of these holes 17, 18, 19 are coincident with the circular axis about which the lever-disk is pivoted when actuated.

To this end the lever-disk 13 has formed along its inner circular edge a set of teeth 20 adapted to receive from a push-ring 23 the braking effort which is transmitted by the lever-disk 13 to the brake-disks 7, 8.

The ratio of the lever arms of the lever-disk 13 to the radial difference between the circular ribs 11, 12 is approximately 10:1 in this example, but this ratio may differ substantially without departing from the spirit and scope of the invention. The braking effort is transmitted to a sleeve 24 carrying a set of teeth 21 corresponding and meshing with the teeth 20 of the lever-disk 13, this sleeve 24 acting upon the lever-disk 13 through the push-ring 23 when the sleeve is moved to the left (Fig. 1).

The braking reaction is transmitted by this sleeve 24 to the fixed hub carrier 25 and this sleeve 24 is adapted to move in the axial direction on the hub carrier, without any frictional contact therewith, in order to preserve the efficient and regular operation of the brake. To this end four (or any other suitable number) parallel axial or straight ball-receiving recesses 31 are formed in the sleeve 24 and engaged by sets of balls 29, the balls of each set being held in spaced relationship with one another by a separator or cage 30 urged by a suitably located spring.

With this arrangement the sleeve 24 may be actuated by a single brake cylinder 26 in which a fluid-driven piston 27 is slidably mounted; in fact, the resulting reaction torque cannot incline the sleeve even if a substantial play existed in the straight ball-recess 31 since any thrust exerted on the sleeve 24 will cause the lever-disk 13 to transmit the braking effort to this sleeve, thereby applying the balls 29 against one side of the relevant ball-recess with a pressure increasing with the effort exerted by the piston 27 on the sleeve 24.

The sleeve 24 is returned to its inoperative or "off" position by springs such as 28; of course, any other suitable spring type may be used for this purpose.

If desired, the sleeve 24 may also be operatively connected to the hub carrier through reaction arms or links, without departing from the spirit and scope of the invention.

As anybody conversant with the art will readily understand, this brake assembly may be sealed against the ingress of dust and water by fitting a diaphragm or like resilient member concentrically to the brake assembly, this diaphragm or like member being carried by the inner face of the wheel-disk and in frictional engagement with a stationary portion of the hub carrier which is of a diameter considerably smaller than the minimum diameter available for this purpose in conventional inter-expanding brakes. This feature is particularly advantageous in the case of vehicles designed for off-the-road service, for example on muddy or sodden grounds.

The sealing arrangement illustrated in Fig. 1 of the conventional type suitable for usual applications at a relatively low cost.

A complemental hand-control (not shown) without any additional lever or linkage may be arranged symmetrically to the brake cylinder 26; this hand-control may be adjustable and if desired used for taking up slack in both control devices.

In Fig. 1 of the drawings the inner diameter of the lever-disk 13 is greater than the outer diameter of the hub, so that the wheel and brake assembly may be removed as a unit in a single operation. However, it will be appreciated that it is also possible to mount the brake assembly separately as usual, if it is preferred to remove the wheel alone, the arrangement illustrated being most advantageous in hard motor races wherein the tires and brake linings wear out simultaneously very rapidly, so that it is possible to replace both without any loss of time with respect to a simple wheel replacement.

What I claim is:

1. A brake comprising a rotor adapted to revolve about its axis and constituting the member to be braked, said rotor having two internal plane friction faces disposed at right angles to the axis of rotation, said faces being connected at a U shape at the outer periphery of said rotor, a pair of annular friction plates housed in said U-shaped outer periphery and adapted to act on said faces, said annular friction plates having registering faces, circular ribs of different radii formed on said registering faces respectively, a stationary support acting as a bearing to said rotor and wherein said rotor is mounted for rotational movement but held against axial sliding movement, said stationary support having an outer surface in which longitudinal hollow raceways are formed, a sleeve member having an inner surface formed with cages, balls carried by said sleeve member in said cages and in rolling engagement with said longitudinal raceways of said stationary support, a circular disk-like lever having an inner edge surrounding said sleeve member and held against axial and rotational movement relative to said sleeve member, and an outer edge disposed between said circular ribs of said registering faces of said two friction plates means for rotatably fastening the outer contour of said disk-like lever with said pair of annular friction disks without interfering with the independent longitudinal sliding movements of said inner contour of said disk-like lever and annular friction disks, and means for axially displacing said sleeve member and therefore the inner contour of said disk-like lever from a position in which said outer edge engages freely the gap left between said pair of circular ribs of said registering friction plates, to a position in which said outer edge applies to said pair of circular ribs forces of opposite directions urging said friction plates on either side of said outer edge until said friction plates engage the internal plane friction faces of said rotor.

2. A brake as defined in claim 1 wherein the rotor constitutes the wheel of a vehicle, the peripheral surface of said rotor being curved to form the rim of the wheel.

3. A brake comprising a rotor adapted to revolve about its axis and constituting the member to be braked, said rotor having two internal plane friction faces disposed at right angles to the axis of rotation, said faces being connected to a U shape at the outer periphery of said rotor, a pair of annular friction plates housed in said U-shaped outer periphery and adapted to act on said faces, said annular friction plates having registering faces, circular ribs of different radii formed on said registering faces respectively, a stationary support acting as a bearing to said rotor and wherein said rotor is mounted for rotational movement and held against axial sliding movement, said rotor having an outer surface in which longitudinal hollow raceways are formed, a sleeve member having an inner surface formed with cages, balls carried by said sleeve member in said cages and in rolling engagement with said longitudinal raceways on said stationary support, a circular disk-like lever having an inner edge surrounding said sleeve member and held against axial and rotational movement relative to said sleeve member, and an outer edge disposed between said circular ribs of said registering faces of said two friction plates means for rotatably fastening the outer contour of said disk-like lever to said pair of annular friction plates without interfering with the independant longitudinal sliding movements of said inner contour of said disk-like lever and said annular friction plates, springs bearing against said stationary support and urging said sleeve member and therefore said inner edge of said disk-like lever to an inoperative position in which said outer edge of said disk-like lever extends freely between said two circular ribs carried by said registering faces of said friction plates, a stationary cylinder having its axis parallel to and spaced from the axis of said rotor, a piston slidably mounted in said cylinder and having an end projecting from said cylinder towards said sleeve member, and hydraulic means for supplying a fluid under pressure to said cylinder to move said piston and cause the piston projecting end to engage said sleeve and therefore move said sleeve and said inner edge of said disk-like lever against the resistance of said springs to a braking position wherein said outer edge of said disk-like lever applies to said pair of registering circular ribs of said annular friction plates forces of opposite directions urging said friction plates on either side of said outer edge until said friction plates are in frictional engagement with said internal friction faces of said rotor, the braking torque transmitted to said sleeve member and supported by said balls held against transverse movement in said longitudinal raceways of said stationary support preventing said sleeve member from tilting under the stress exerted asymmetrically on said sleeve member by said single piston the position of which is offset relative to the axis of said rotor.

4. A brake comprising a rotor adapted to revolve about its axis and constituting the member to be braked, said rotor having two internal plane friction faces disposed at right angles to the axis of rotation, said faces being connected to a U shape at the outer periphery of said rotor, a pair of annular friction plates housed in said U-shaped outer periphery and adapted to act on said faces, said annular friction plates having registering faces, circular ribs of different radii formed on said registering faces respectively, a stationary support acting as a bearing for said rotor and wherein said rotor is mounted for rotational movement but held against axial sliding movement, said stationary support having an outer surface in which longitudinal hollow raceways are formed, a sleeve member having an inner surface formed with cages, balls carried by said sleeve member in said cages and in rolling engagement with said longitudinal raceways of said stationary support, a circular disk-like lever having an inner edge surrounding said sleeve member and held against axial and rotational movement relative to said sleeve member, and an outer edge disposed between said circular ribs of said registering faces of said two friction plates, means for permitting the longitudinal sliding movement of said pair of annular friction plates relative to said disk-like lever while preventing their relative rotation, springs bearing against said stationary support and urging said sleeve member and therefore said inner edge of said disk-like lever to an inoperative position in which said outer edge of said disk-like lever extends freely between said two circular ribs carried by said registering faces of said friction plates, a push member mounted for sliding movement parallel to and spaced from the rotor axis, said push member being adapted to engage said sleeve member, and means for forcing said push member against said sleeve member and therefore move said sleeve member and said inner edge of said disk-like lever against the resistance of said springs towards a braking position in which said outer edge of said disk-like lever applies against said registering pair of circular ribs forces of opposite directions, whereby said pair of annular friction plates are moved on either side of said outer edge until said pair of annular friction plates are in frictional engagement with said internal frictional faces of the rotor, the braking torque transmitted to said sleeve member and supported by said balls held against transverse movement in said longitudinal raceways of said stationary support preventing said sleeve member from tilting under the stress exerted asymmetrically on said sleeve member by said push-member the position of which is offset relative to the axis of said rotor.

References Cited in the file of this patent

UNITED STATES PATENTS

| | | |
|---|---|---|
| 1,270,533 | Lombard | June 25, 1918 |
| 2,073,146 | Gardiner | Mar. 9, 1937 |
| 2,381,393 | Brown | Aug. 7, 1945 |
| 2,682,943 | Root | July 6, 1954 |
| 2,700,444 | Ahlen | Jan. 25, 1955 |

FOREIGN PATENTS

| | | |
|---|---|---|
| 803,742 | Germany | Apr. 9, 1951 |
| 725,688 | Great Britain | Mar. 9, 1955 |